Nov. 29, 1966  OKI INAZAWA  3,288,431
VALVE
Filed July 11, 1963
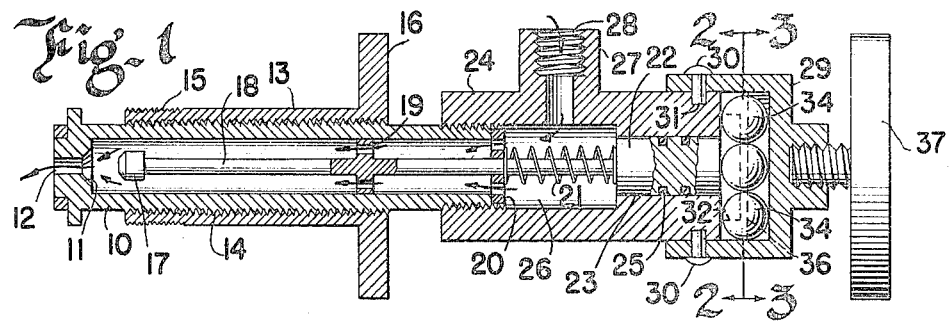
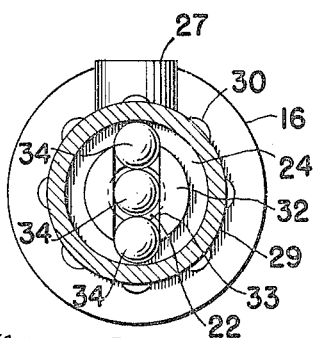
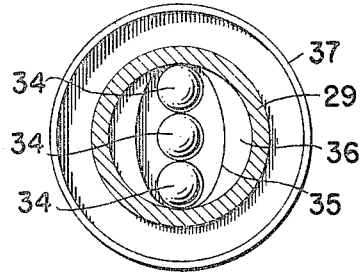
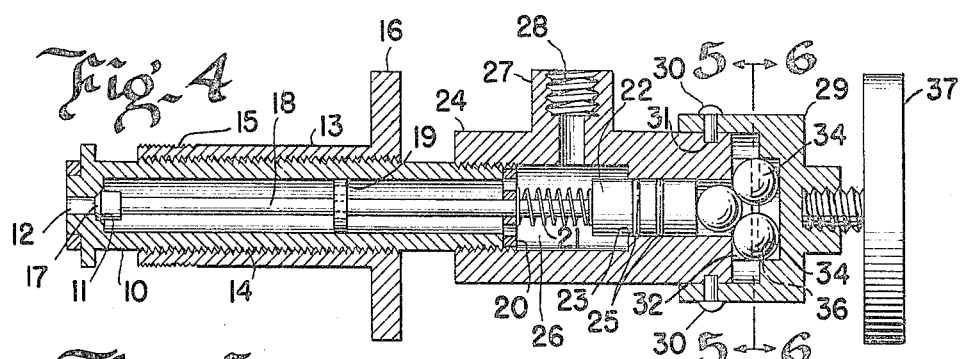
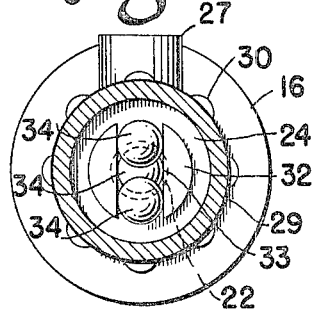
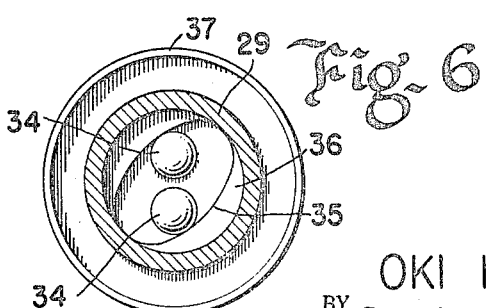
INVENTOR.
OKI INAZAWA
BY
Marshall, Wilson & Yeasting
~ attorneys ~

United States Patent Office 3,288,431
Patented Nov. 29, 1966

3,288,431
VALVE
Oki Inazawa, Kobe, Japan, assignor to Daido Kogyo
Kaisha, Ltd., Osaka, Japan, a corporation of Japan
Filed July 11, 1963, Ser. No. 294,397
4 Claims. (Cl. 251—254)

This invention relates to valves and more particularly to vales for filling cylinders with fule gas such as butane, propane and natural gas.

Heretofore, the valves used for filling cylinders with fuel gas have been operated by turning their handles several times. This is not efficient in large scale production. Also, such prior valves have not been presettable to optimum open settings.

Accordingly, the objects of this invention are to improve valves, to increase the efficiency of valves to facilitate the operation of valves, to simplify the construction of valves, to provide valves which are opened and closed by turning their handles through substantially less than one revolution, to provide valves which are presettable to optimum open settings, and to provide valves which are simple to use and which perform well in high capacity production.

One embodiment of this invention enabling the realization of these objects is a valve having a plunger which cooperates with a valve seat for opening and closing the valve. The plunger is operated by the action of three balls normally in an elliptically shaped groove in a handle the turning of which in one direction drives one of the balls out of the groove and toward the valve seat in opposition to a spring to close the valve and the turning of which in the reverse direction permits the spring to return the balls to their original positions to open the valve.

In accordance with the above, one feature of this invention resides in the ability of the valve to be opened or closed by turning the handle through substantially less than one revolution, e.g., through forty-five degrees.

Another feature resides in being able to preset the valve to its optimum opening setting. This is accomplished by selecting the open position of the plunger which produces the best results.

The above and other objects and features of this invention will be appreciated more fully from the following detailed description when read with reference to the accompanying drawings wherein:

FIG. 1 is a vertical sectional view of a valve according to this invention in its open position;

FIG. 2 is a horizontal sectional view taken along the line 2—2 of FIG. 1;

FIG. 3 is a horizontal sectional view taken along the line 3—3 of FIG. 1;

FIG. 4 is a vertical sectional view of the valve shown in FIG. 1 with the working parts shown in their valve closing positions;

FIG. 5 is a horizontal sectional view taken along the line 5—5 of FIG. 4; and

FIG. 6 is a horizontal sectional view taken along the line 6—6 of FIG. 4.

Referring to the drawings, the valve includes a hollow cylindrical casing 10 provided with a valve seat 11 communicating with an egress opening 12. The cylindrical casing 10 carries a sleeve 13 having internal threads 14 engaging external threads on the cylindrical casing 10 and having external threads 15 which function to connect the valve to a cylinder to be filled with fuel gas. A handle 16 forms the top of the sleeve 13. In operation, the valve's egress opening 12 is inserted in the top of a cylinder to be filled with fuel gas and the external threads 15 on the sleeve 13 are engaged with threads in the top of the gas cylinder and the handle 16 is turned to connect the valve to the gas cylinder. When the valve is open, fuel gas is delivered to the cylinder as indicated by the arrows in FIG. 1.

A plunger 17 carried on a rod 18 cooperates with the valve seat 11 to close the valve as shown in FIG. 4, the rod 18 being provided with a perforated flange 19 which is slidable on the inside of the hollow cylindrical casing 10 to act as a valve guide. The upper end of the rod 18 extends through a perforated washer 20 held atop the cylindrical casing 10 by means of a coil spring 21 surrounding the upper end of the rod 18. The upper end of the rod 18 carries a solid cylinder 22 which is slidably mounted in a recess which is in the form of a bore 23 in a piston box 24 connected to the upper end of the cylindrical casing 10, there being two O-rings 25 in circumferential grooves in the cylinder 22 to make the bore 23 gas-tight. The spring 21 is located in an enlarged portion 26 of the bore 23 and is compressed between the washer 20 and the cylinder 22. The relaxed or valve-open position of the spring 21 is shown in FIG. 1 and the compressed or valve-closed position of the spring 21 is shown in FIG. 4. A cylindrical projection 27 on the piston box 24 is provided with a threaded bore 28 communicating with the bore portion 26 of the piston box 24 and functions as a means to attach the valve to a source of fuel gas, the gas flowing through the valve as indicated by the arrows in FIG. 1.

A cup-shaped member 29 is rotatably mounted atop the piston box 24 by means of pins 30 fixed in and extending through the cup-shaped member 29 and received in a circumferential groove 31 in the piston box 24. This pivotally mounts the cup-shaped member 29, which is provided with a handle 37, on top of the piston box 24. Alternatively, the pins 30 can be screws threaded through the sides of the cup-shaped member 29 and slidably engaged in the groove 31.

The piston box 24 at its upper end is provided with an integrally formed crown 32 which functions as a ball guide, the crown being provided with a diametrical groove or slot 33 which receives three balls 34 in a close fit. When the valve is open as shown in FIGS. 1–3, the end balls 34 rest upon the top of the piston box 24 and the middle ball 34 rests upon the top of the cylinder 22, the balls 34 being in a straight row in the ball guiding slot 33. In such position, half or more of the balls 34 extend above the top of the crown 32.

The cup-shaped member 29 is provided with an elliptically shaped groove 35 which receives, in the open position of the valve shown in FIG. 1, the upper parts of the balls 34 which extend out of the ball guiding slot 33. In the positions of the working parts shown in FIGS. 1–3, the major axis of the elliptical groove 35 is aligned with the longitudinal axis of the slot 33. In such open position of the valve, the coil spring 21 holds the cylinder 22 up against the middle ball 34 and the three balls 34 are in a straight row with the end balls 34 contacting the ends of the elliptically shaped groove, the three balls being located on the major axis of the ellipse. The top of the crown 32 and the bottom 36 of the inside of the cup-shaped member 29 which defines the elliptically shaped groove 35 are so spaced apart that the valve handle 37 can be turned without interference between such crown 32 and such bottom 36 of the inside of the member 29.

In operation, the valve is connected to a source of fuel gas and to a cylinder to be filled as described above, the valve being in its closed position shown in FIGS. 4–6. In the open position of the valve as described above and as shown in FIGS. 1–3, the three balls 34 are in a straight row about half in the ball guiding slot 33 and about half in the elliptically shaped groove 35. A forty-five degree turn of the valve handle 37 closes the valve. The limit to the amount of possible rotation of the valve handle 37 is determined by the distance between the plunger 17 and the valve seat 11. One of the features of the valve resides in being able to preset the valve to its optimum open setting by simply selecting the open position of the plunger which produces the best results. Accordingly, the above forty-five degree rotation of the valve handle 37 closes the valve as shown because that is the amount of handle turn necessary to accomplish movement of the plunger 17 from its open position shown in FIG. 1 to its closed position shown in FIG. 4. The main feature of the valve resides in the fact that the valve is opened or closed by turning the handle through substantially less than one revolution.

In turning the handle 37 from its open position shown in FIGS. 1–3 toward its closed position shown in FIGS. 4–6, the sides of the elliptically shaped groove 35 force the end balls 34 toward the middle ball 34. Since the balls 34 are held in the stationary ball guiding slot 33 in the crown 32, the middle ball 34 is driven toward the valve seat 11 along the path of least resistance in opposition to the spring 21 until the plunger 17 engages the valve seat 11 locating the balls 34 as shown in FIGS. 4–6. The cylinder 22 acts as a resiliently biased member which is in contact with the middle ball to resist the entry of the middle ball into the recess or bore 23. In the closed position of the valve (FIGS. 4–6), the middle ball 34 is in the bore 23 of the piston box 24 and the cylinder 22 has been driven toward the valve seat 11 by such middle ball 34, while the end balls 34 have been driven by the minor axis sides of the elliptically shaped groove into juxtaposed positions. As shown in FIG. 3, the three balls 34 are in a straight row along the major axis of the ellipse (valve open) and, as shown in FIG. 6, the eliptical groove 35 has been turned about forty-five degrees driving the middle ball 34 into the bore 23 as shown in FIG. 4 (valve closed). Return of the handle 37 to its position shown in FIG. 1 permits the spring 21 to shift the cylinder 22 driving the middle ball 34 out of the bore 23 back into its position shown in FIGS. 1–3. Since in the positions of the working parts shown in FIGS. 1–3, the major axis of the elliptical groove 35 is in alignment with the longitudinal axis of the slot 33, the middle ball 34 in moving out of the bore 23 pushes the end balls 34 back into their positions shown in FIGS. 1–3 (three balls 34 again being in a straight row).

It is to be understood that the above description is illustrative of this invention and that various modifications thereof can be utilized without departing from its spirit and scope.

Having described the invention, I claim:

1. A valve comprising, in combination, a housing defining a valve seat, valve mechanism contained in the housing and engageable with the valve seat, first and second relatively rotatable members having opposed faces which are transverse to the axis of rotation, three balls which are adapted to be held between the opposed faces of the two relatively rotatable members, each of the two opposed faces having a diametrical groove to receive the three balls, the groove in the first member fitting the balls relatively closely and communicating with a central recess in the first member for receiving the middle ball, and the groove in the second member being substantially wider and having a depth less than half the diameter of the outermost balls so that upon relative rotation of the two members the edges of such groove sweep inward as they contact the two outermost balls, thus rotating the contacted portions of the outermost balls toward the middle ball to drive the middle ball toward the first member and into the recess, a resiliently biased member which is in contact with the middle ball to resist the entry of the middle ball into the recess, and an operative connection between the middle ball and the valve mechanism to effect operation of the valve mechanism upon movement of the middle ball into and out of the recess.

2. A valve according to claim 1 wherein the resiliently biased member is a plunger which is axially movable in the recess, and wherein the operative connection between the middle ball and the valve mechanism comprises an operative connection between the plunger and the valve mechanism.

3. A valve according to claim 1 wherein the groove in the second member is in the shape of an ellipse the major axis of which is approximately equal to the sum of the diameters of the three balls.

4. A valve according to claim 3 wherein the resiliently biased member is a plunger which is axially movable in the recess, and wherein the operative connection between the middle ball and the valve mechanism comprises an operative connection between the plunger and the valve mechanism.

References Cited by the Examiner

UNITED STATES PATENTS

| | | | |
|---|---|---|---|
| 1,274,646 | 8/1918 | Watrous | 251—254 |
| 1,511,830 | 10/1924 | Foley | 251—254 |

FOREIGN PATENTS 1,094,544  12/1960  Germany.

WILLIAM F. O'DEA, *Primary Examiner.*

ISADOR WEIL, *Examiner.*

D. MATTHEWS, *Assistant Examiner.*